(12) United States Patent
Sabard et al.

(10) Patent No.: US 10,844,221 B2
(45) Date of Patent: Nov. 24, 2020

(54) POLYAMIDE-BASED COMPOSITIONS THAT ARE RIGID AND DUCTILE AT LOW TEMPERATURE FOR THE PREPARATION OF SPORTS ARTICLES OBTAINED BY INJECTION MOLDING

(71) Applicant: Arkema France, Colombes (FR)

(72) Inventors: Mathieu Sabard, Serquigny (FR); Regis Cipriani, Tournedos Bois Hubert (FR); Karine Loyen, Pont-Audemer (FR); Helena Cheminet, St Martin du Tilleul (FR); René-Paul Eustache, Combon (FR)

(73) Assignee: Arkema France, Colombes (FR)

( * ) Notice: Subject to any disclaimer, the term of this patent is extended or adjusted under 35 U.S.C. 154(b) by 4 days.

(21) Appl. No.: 16/082,427

(22) PCT Filed: Mar. 16, 2017

(86) PCT No.: PCT/FR2017/050606
§ 371 (c)(1),
(2) Date: Sep. 5, 2018

(87) PCT Pub. No.: WO2017/158301
PCT Pub. Date: Sep. 21, 2017

(65) Prior Publication Data
US 2019/0085164 A1   Mar. 21, 2019

(30) Foreign Application Priority Data
Mar. 18, 2016   (FR) ...................... 16 52298

(51) Int. Cl.
| | |
|---|---|
| *C08L 77/02* | (2006.01) |
| *C08L 77/06* | (2006.01) |
| *C08L 23/16* | (2006.01) |
| *B29B 9/10* | (2006.01) |

(52) U.S. Cl.
CPC ............... *C08L 77/02* (2013.01); *C08L 23/16* (2013.01); *C08L 77/06* (2013.01); *B29B 9/10* (2013.01); *C08L 2203/30* (2013.01); *C08L 2207/53* (2013.01)

(58) Field of Classification Search
CPC ................................................ C08L 2205/025
See application file for complete search history.

(56) References Cited

U.S. PATENT DOCUMENTS

| | | |
|---|---|---|
| 7,122,233 B2 | 10/2006 | Montanari et al. |
| 8,563,653 B2 | 10/2013 | Buehler et al. |
| 9,856,350 B2 | 1/2018 | Sallard et al. |
| 2005/0165175 A1* | 7/2005 | Montanari ............. A63C 5/003 |
| | | 525/419 |
| 2009/0149600 A1 | 6/2009 | Ness |
| 2009/0247699 A1* | 10/2009 | Buehler .................. C08L 55/00 |
| | | 525/64 |
| 2011/0105697 A1 | 5/2011 | Buhler et al. |
| 2015/0225505 A1 | 8/2015 | Blondel et al. |

FOREIGN PATENT DOCUMENTS

| | | |
|---|---|---|
| EP | 0342066 A1 | 11/1989 |
| EP | 0471566 A1 | 2/1992 |
| EP | 0722961 A1 | 7/1996 |
| EP | 1227131 A1 | 7/2002 |
| EP | 1527873 A1 | 5/2005 |
| EP | 2107083 A2 | 10/2009 |
| WO | 2006008357 A | 1/2006 |
| WO | 2009153534 A1 | 12/2009 |
| WO | 2014037647 A1 | 3/2014 |

OTHER PUBLICATIONS

International Search Report and Written Opinion for International Application No. PCT/FR2017/050600, dated Jun. 20, 2017—10 pages.

* cited by examiner

*Primary Examiner* — Ana L. Woodward
(74) *Attorney, Agent, or Firm* — Thomas F. Roland

(57) ABSTRACT

Provided is a composition including (A) 65% to 95% of a polyamide mixture, (B) 7% to 30% of at least one impact modifier or of at least one core-shell entity or of a mixture thereof, and (C) 0 to 5% of at least one additive chosen from stabilizers, dyes, plasticizers, fibers, fillers, processing aids or a mixture thereof. The composition may be used, for example, to produce an article by extruding, injection molding, molding or thermoforming.

23 Claims, 6 Drawing Sheets

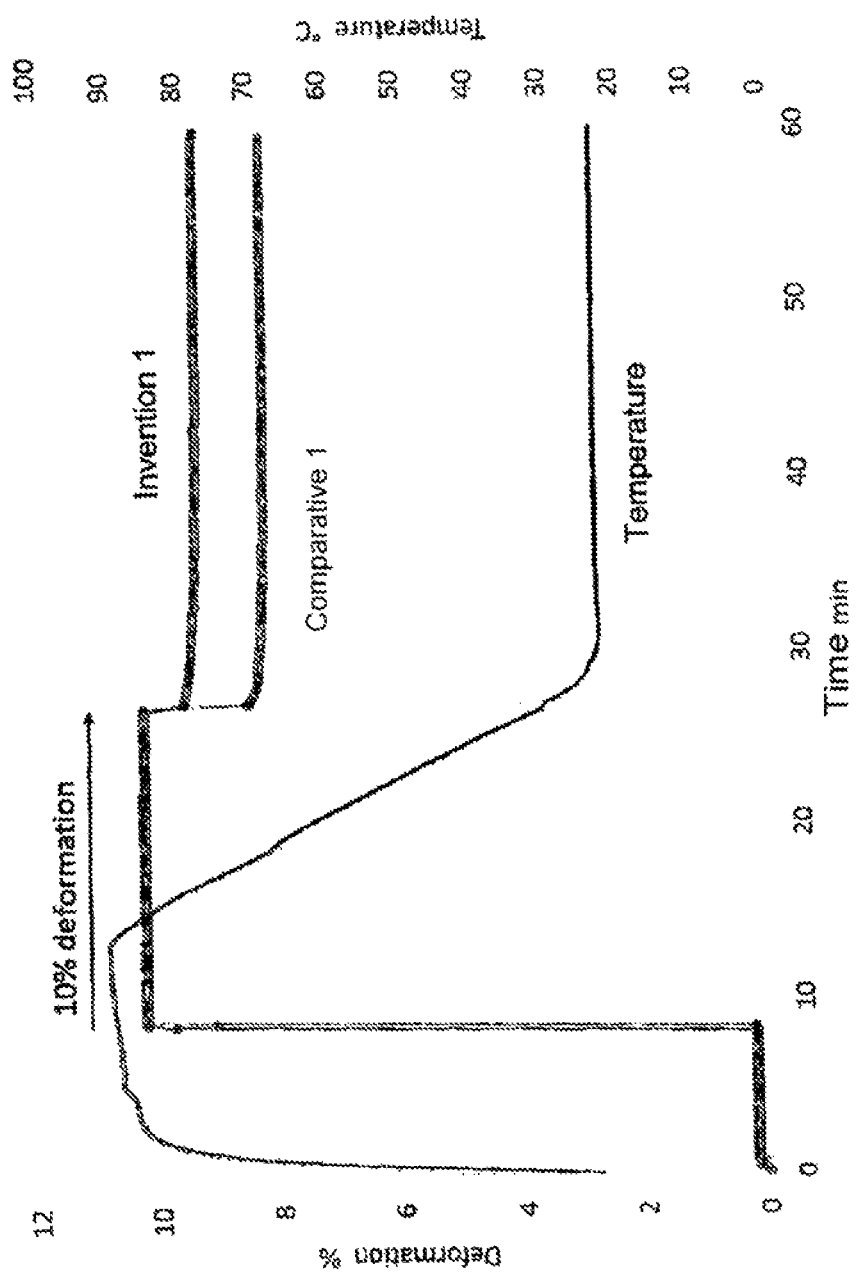
[Figure 6]

POLYAMIDE-BASED COMPOSITIONS THAT ARE RIGID AND DUCTILE AT LOW TEMPERATURE FOR THE PREPARATION OF SPORTS ARTICLES OBTAINED BY INJECTION MOLDING

CROSS-REFERENCE TO RELATED APPLICATIONS

This is the national phase of International Application No. PCT/FR2017/050606, filed 16 Mar. 2017, which claims priority to French Application No. 16-52298, filed 18 Mar. 2016. The disclosure of each of these applications is incorporated herein by reference in its entirety for all purposes.

FIELD OF THE INVENTION

The present invention relates to polyamide-based compositions that are rigid and ductile at low temperature, for the preparation of sports articles obtained by injection molding that have an advantageous compromise of rigidity, ductility, fatigue strength, injectability and also thermoforming properties, and uses thereof.

The present invention also relates to a process for preparing said compositions and also the objects manufactured with said compositions such as fibers, fabrics, films, sheets, rods, tubes or injection-molded parts, especially sports articles especially a ski boot or a part of a ski boot or a rigid boot with studs, such as a soccer, rugby or American football boot, a hockey boot or a part of a hockey boot, or a running shoe, a golf ball or a part of a golf ball, or a lacrosse stick or else a hockey article such as a helmet, etc. or sports articles for protecting the head, shoulders, elbows, hands, knees, back or shin, such as a helmet, gloves, shoulder pads, elbow pads, knee pads or shin pads in all types of sport where the participants are subject to strong impacts, or else optical articles, in particular glasses or goggles, especially glasses or goggles used when playing a sport such as protective glasses or ski goggles.

BACKGROUND OF THE INVENTION

Manufacturers of sports articles are confronted with several challenges.

The articles must evolve toward being lighter in order to reduce as much as possible the energy expended during their use.

They must also enable the sportsperson to obtain the sensations required for movement control and rapidly transmit muscle impulses.

The rigidity of a part is directly linked to the elastic modulus of the constituent material of this part and to the cube of the thickness of the walls.

A material with a high modulus makes it possible to reduce part thicknesses and therefore to make a considerable saving regarding the weight of these parts while keeping the rigidity required for a good elastic return essential to the sportsperson.

In many sports articles, it is also necessary to guarantee good impact resistance (cold shock on a ski boot for example) and also good resistance to repeated stresses (bending of the sole of a football boot, shoulder pads, elbow pad, knee pads or shin pad, for example).

The articles, in particular ski boots, must also have thermoforming properties in order to be able to perfectly adapt the boot, in particular the toe of the boot, to the foot.

Similarly, the combination of rigidity, impact resistance and thermoformability of the compositions of the invention is advantageous for optical applications. The composition of the invention offers in particular the possibility of adjusting the shape of the frame of the glasses or goggles to the morphology of the face (ears, nose, etc.) after heating in order to increase safety and comfort during use.

SUMMARY OF THE INVENTION

Moreover, the articles must be able to be easily injection-molded and must make it possible to obtain parts which have an impeccable appearance and an ability to be colored in varied colors.

International application WO 2014/037647 describes a transparent composition, comprising a copolyamide of the following general formula A/X.Y, the unit X representing an alicyclic diamine unit, said composition being used for the manufacture of a transparent molded article, such as a shoe sole or a shoe sole component, in particular of a sports shoe.

International application WO 09/153534 describes in particular a composition comprising an amorphous polyamide, a semicrystalline polyamide and an elastomer for the manufacture of various objects such as spectacle frames, spectacle lenses, electrical, electronic or motor vehicle equipment, surgical equipment, packaging or else sports articles.

Application US 2011/105697 describes a transparent molding composition comprising an amorphous polyamide, a semicrystalline polyamide and an elastomer in a proportion of from 0 to 10% for the manufacture of transparent articles for the manufacture of sports articles.

BRIEF DESCRIPTION OF THE FIGURES

FIG. 6 presents the formability of the composition of the invention (invention 1). This ability was evaluated by DMA (Dynamical Mechanical Analysis) at 10% deformation.
Left y-axis: Deformation (%)
Right y-axis: Temperature (° C.)
x-axis: time (minutes)

SUMMARY OF THE INVENTION

Figure 1:
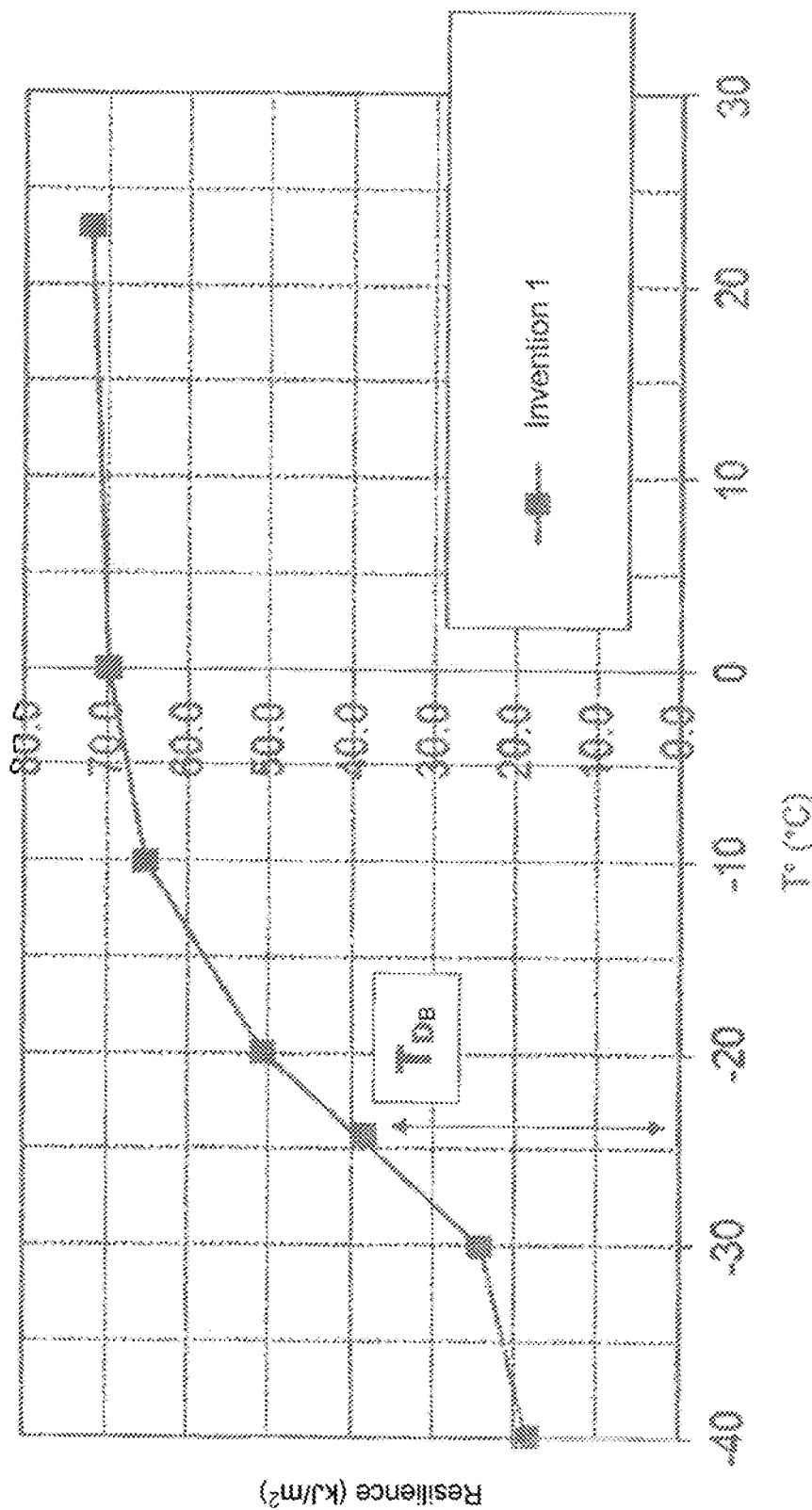
FIG. 1 presents the ductile-brittle transition ($T_{DB}$) of the composition of the invention (invention 1) (notched and conditioned bars).
x-axis: temperature in ° C.
y-axis: Resilience (kJ/m$^2$)

Patent EP 1227131 describes a transparent composition comprising an amorphous polyamide, a semicrystalline polyamide and a flexible modifier for decorating the tops of skis.

However, none of these compositions makes it possible to obtain a compromise between the rigidity at ambient temperature, the ductility at low temperature, and fatigue strength.

The invention consists of the development of blends of amorphous polyamides, semicrystalline polyamides and impact modifier which exhibit a compromise between rigidity, impact and flex life and which have a fluidity optimized for the injection-molding of sports articles and thermoforming properties.

The applicant has thus surprisingly discovered that the selection of a particular range of amorphous polyamide, of a particular range of semicrystalline polyamide and of a particular range of impact modifier enabled the preparation of compositions that have a good compromise between the impact level, the rigidity, the processability for the injection molding of thin parts and that have excellent thermoforming properties, which are especially intended for the manufacture of sports articles.

The present invention relates to a composition comprising, by weight, the total being equal to 100%:

(A) 65% to 95%, especially from 65% to 93%, in particular from 65% to 90% of a polyamide mixture comprising from:
  10% to 90% by weight of at least one semicrystalline polyamide, of which the mean number of carbon atoms relative to the nitrogen atom is greater than 9, said semicrystalline polyamide being of formula A/Z wherein,
    A is an aliphatic repeating unit chosen from a unit obtained from the polycondensation of at least one amino acid, a unit obtained from the polycondensation of at least one lactam and a unit X.Y obtained from the polycondensation:
      of at least one diamine, said diamine being a linear or branched aliphatic diamine, or a mixture thereof, and
      of at least one dicarboxylic acid, said diacid being a linear or branched aliphatic diacid,
      said diamine and said diacid comprising from 4 to 36 carbon atoms, advantageously from 6 to 18 carbon atoms, and
    Z represents another aliphatic repeating unit or XY unit different from A and is included from 0 to 20%;
  90% to 10% by weight of at least one amorphous polyamide,
(B) 5% to 30%, especially from 7% to 30%, in particular from more than 10% to 30% of at least one impact modifier or of at least one core-shell entity or of a mixture thereof,
(C) 0 to 5%, in particular from 0.1% to 5%, of at least one additive chosen from stabilizers, dyes, plasticizers, fibers, fillers, processing aids or a mixture thereof, said amorphous polyamide being in a sufficient proportion so that the composition is sufficiently ductile at low temperature, and rigid, and has in particular a $T_{DB}<0°$ C. as determined according to the standard ISO 179 1 eA and a flexural modulus of greater than 900 MPa as determined according to the standard ISO 178: 2010, and said composition being free of PEBA for the manufacture in particular of a sports or optical article.

$T_{DB}$ is the ductile-brittle transition temperature which corresponds to the temperature at which a material passes from ductile behavior (partial breaking of the material) to brittle behavior (complete fracture of the material). The ductile-brittle transition may therefore be seen as a temperature range where there is 50% brittle fracture (brittle behavior of the sample) and 50% partial fracture (ductile behavior of the sample) and a competition between ductile behavior and brittle behavior.

The Charpy impact test carried out according to the standard ISO 179 1 eA makes it possible to obtain the resilience.

The ductile-brittle transition ($T_{DB}$) therefore corresponds to the point of inflexion of the curve of resilience as a function of temperature (see figures).

The flexural modulus is determined after conditioning for 15 days at 23° C. with a relative humidity of 50%.

Throughout the description, all the percentages of (A), (B) and (C) are given by weight.

Throughout the description, the limits of the ranges of values presented are included.

Another advantage of the composition of the invention is that the elastic modulus, determined in DMA (Dynamical Mechanical Analysis) according to the standard ISO 6721-4: 2008, remains stable between −40° C. and +30° C., that is to say that the elastic modulus at 30° C./elastic modulus at −40° C. ratio<1.3. The range −40° C. and +30° C. corresponds to the temperature range of the various uses of the composition of the invention.

For the purposes of the invention, an amorphous polyamide denotes a transparent amorphous polyamide having only a glass transition temperature (no melting point (Tm)), or a polyamide with very low crystallinity, having a glass transition temperature and a melting point such that the enthalpy of crystallization during the cooling step at a rate of 20 K/min in Differential Scanning calorimetry (DSC) measured according to the standard ISO 11357-3: 2013 is less than 30 J/g, in particular less than 20 J/g, preferably less than 15 J/g. The glass transition temperature (Tg) measured by DSC at a heating rate of 20 K/min according to the standard ISO 11357-1:2009 and ISO 11357-2: 2013 for these polyamides is greater than 75° C.

For the purposes of the invention, a semicrystalline polyamide denotes a polyamide which has a melting point (Tm) in DSC according to the standard ISO 11357-3: 2013, and an enthalpy of crystallization during the cooling step at a rate of 20 K/m in DSC measured according to the standard ISO 11357-3 of 2013 which is greater than 30 J/g, preferably greater than 40 J/g.

The term "polyamide" using the present description covers both homopolyamides and copolyamides.

The term "ductile" denotes the ability of a material to deform plastically without breaking.

Advantageously, the composition of the invention is a thermoformable composition.

Regarding the Constituent (A):
Semicrystalline Polyamide:

The mean number of carbon atoms relative to the nitrogen atom is greater than 9.

Advantageously, it is greater than 10.

In the case of a PA-X.Y type homopolyamide, the number of carbon atoms per nitrogen atom is the mean of the X unit and the Y unit.

In the case of a copolyamide, the number of carbons per nitrogen is calculated according to the same principle. The calculation is made on a molar pro rata basis of the various amide units.

A: Aliphatic Repeating Unit

In a first variant of the invention, the aliphatic repeating unit A is obtained from the polycondensation of an aminocarboxylic acid comprising from 9 to 12 carbon atoms. It can thus be chosen from 9-aminononanoic acid (denoted 9), 10-aminodecanoic acid (denoted 10), 11-aminoundecanoic acid (denoted 11) and 12-aminododecanoic acid (denoted 12); advantageously, the aminocarboxylic acid is 11-aminoundecanoic acid.

In a second variant of the invention, the aliphatic repeating unit A is obtained from the polycondensation of a lactam comprising from 9 to 12 carbon atoms. It can thus be chosen from decanolactam (denoted 10), undecanolactam (denoted 11) and laurolactam or lauryllactam (denoted 12); advantageously, the lactam is undecanolactam.

More particularly preferably, the repeating unit A is obtained from a single aminocarboxylic acid or a single lactam.

Nonetheless, it is entirely possible to envision using, to obtain this same unit A, a mixture of two or more aminocarboxylic acids, a mixture of two or more lactams, but also a mixture of one, two or more aminocarboxylic acids with one, two or more lactams.

A: Repeating Unit X.Y

The repeating unit X.Y is a unit obtained from the polycondensation of at least one linear or branched aliphatic diamine, or of a mixture of two or more thereof and of at least one aliphatic dicarboxylic acid.

The molar proportions of diamine and of dicarboxylic acid are preferentially stoichiometric.

The diamine and also the dicarboxylic acid each comprise from 4 to 36 carbon atoms and, advantageously, from 6 to 18 carbon atoms.

The aliphatic diamine used to obtain this repeating unit X.Y is an aliphatic diamine which has a linear main chain comprising at least 4 carbon atoms.

This linear main chain can, where appropriate, comprise one or more methyl and/or ethyl substituents; in said configuration, the term "branched aliphatic diamine" is used. In the case where the main chain comprises no substitute, the aliphatic diamine is termed "linear aliphatic diamine".

Whether or not it comprises methyl and/or ethyl substituents on the main chain, the aliphatic diamine used to obtain this repeating unit X.Y comprises from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then corresponds to the formula $H_2N-(CH_2)_x-NH_2$ and can be chosen for example from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecenediamine and octadecenediamine. The linear aliphatic diamines that have just been mentioned may all be biobased within the meaning of standard ASTM D6866.

When this diamine is a branched aliphatic diamine, it can in particular be 2-methylpentanediamine, 2-methyl-1,8-octanediamine or (2,2,4 or 2,4,4) trimethylenehexanediamine.

The dicarboxylic acid may be selected from linear or branched aliphatic dicarboxylic acids.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in document EP 0 471 566.

By way of example, the units X.Y are chosen from polydecamethylene dodecanamide (PA-10.12); polydecamethylene sebacanamide (PA-10.10) and polydecamethylene dodecanamide (PA-12.12), advantageously the unit X.Y represents polydecamethylene sebacanamide (PA-10.10).

Z: Other Polyamide

Z denotes another polyamide and may correspond to an aliphatic repeating unit or a unit X.Y as defined above, provided that it is different from A.

The proportion of Z present is from 0 to 20% by weight relative to the sum A+Z, in particular from 0.1% to 20%.

Amorphous Polyamide:

The amorphous polyamide may be a homopolyamide or a copolyamide. The amorphous polyamides are chosen from aliphatic, cycloaliphatic and aromatic polyamides or a mixture thereof.

In particular, the amorphous polyamide (or when the composition comprises a mixture of amorphous polyamides, at least one of the amorphous polyamides, or even each of the amorphous polyamides) comprises at least one unit corresponding to the formula Ca diamine.Cb diamine.

The repeating unit Ca diamine.Cb diamine is a unit obtained from the polycondensation of at least one linear or branched aliphatic diamine, or of at least one cycloaliphatic diamine or of at least one aromatic diamine or of a mixture of two or more thereof and of at least one aliphatic dicarboxylic acid or of at least one cycloaliphatic dicarboxylic acid or of at least one aromatic dicarboxylic acid.

The molar proportions of diamine and of dicarboxylic acid are preferentially stoichiometric.

The diamine and also the dicarboxylic acid each comprise from 4 to 36 carbon atoms and, advantageously, from 6 to 18 carbon atoms.

The aliphatic diamine used to obtain this repeating unit Ca diamine.Cb diacid is as defined above for the diamine X.

The cycloaliphatic diamine can be chosen for example from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane or 3'-dimethyl-4,4'-diaminodicyclohexylmethane commonly referred to as "BMACM" or "MACM" (and denoted B hereinafter), p-bis(aminocyclohexyl)methane commonly referred to as "PACM" (and denoted P hereinafter), isopropylidenedi(cyclohexylamine) commonly referred to as "PACP", isophoronediamine (denoted IPD hereinafter) and 2,6-bis(aminomethyl)norbornane commonly referred to as "BAMN".

A nonexhaustive list of these cycloaliphatic diamines is given in the publication "Cycloaliphatic Amines" (Encyclopedia of Chemical Technology, Kirk-Othmer, 4th Edition (1992), pp. 386-405).

The aromatic diamine can be chosen from 1,3-xylylenediamine and 1,4-xylylenediamine.

The dicarboxylic acid can be chosen from linear or branched aliphatic dicarboxylic acids, cycloaliphatic dicarboxylic acids and aromatic dicarboxylic acids.

When the dicarboxylic acid is aliphatic and linear, it is as defined above for the diacid Y.

When the dicarboxylic acid is cycloaliphatic, it may comprise the following carbon backbones: norbornylmethane, cyclohexane, cyclohexylmethane, dicyclohexylmethane, dicyclohexylpropane, di(methylcyclohexyl) or di(methylcyclohexyl)propane.

When the dicarboxylic acid is aromatic, it can be chosen from terephthalic acid (denoted T), isophthalic acid (denoted I) and a naphthalenic acid.

Regarding (B):

Regarding the Impact Modifier

The impact modifier advantageously consists of a polymer having a flexural modulus of lower than 100 MPa measured according to standard ISO 178 and a Tg of less than 0° C. (measured according to standard 11357-2 at the inflection point of the DSC thermogram), in particular a polyolefin.

The polyolefin of the impact modifier may be functionalized or unfunctionalized or be a mixture of at least one which is functionalized and/or at least one which is unfunctionalized. To simplify, the polyolefin has been denoted (B) and functionalized polyolefins (B1) and unfunctionalized polyolefins (B2) have been described below.

An unfunctionalized polyolefin (B2) is conventionally a homopolymer or copolymer of alpha-olefins or diolefins, such as, for example, ethylene, propylene, 1-butene, 1-octene, butadiene. By way of example, mention may be made of:

polyethylene homopolymers and copolymers, in particular LDPE, HDPE, LLDPE (linear low density polyethylene), VLDPE (very low density polyethylene) and metallocene polyethylene, propylene homopolymers or copolymers, ethylene/alpha-olefin copolymers, such as ethylene/propylene, EPRs (abbreviation of ethylene-propylene rubbers) and ethylene-propylene-dienes (EPDMs), styrene/ethylene-butene/styrene (SEBS), styrene/butadiene/styrene (SBS), styrene/isoprene/styrene (SIS) or styrene/ethylene-propylene/styrene (SEPS) block copolymers;

copolymers of ethylene with at least one product chosen from the salts or esters of unsaturated carboxylic acids such as alkyl (meth)acrylate (for example methyl acrylate), or vinyl esters of saturated carboxylic acids such as vinyl acetate (EVA), the proportion of comonomer possibly reaching 40% by weight.

The functionalized polyolefin (B1) may be a polymer of alpha-olefins having reactive units (functionalities); such reactive units are acid, anhydride or epoxy functions. By way of example, mention may be made of the previous polyolefins (B2) grafted or copolymerized or terpolymerized by unsaturated epoxides such as glycidyl (meth)acrylate, or by carboxylic acids or the corresponding salts or esters such as (meth)acrylic acid (the latter possibly being totally or partially neutralized by metals such as Zn, etc.) or else by carboxylic acid anhydrides such as maleic anhydride. A functionalized polyolefin is for example a PE/EPR mixture, the weight ratio of which may vary within broad limits, for example between 40/60 and 90/10, said mixture being cografted with an anhydride, especially maleic anhydride, at a degree of grafting for example from 0.01% to 5% by weight.

The functionalized polyolefin (B1) may be chosen from the following (co)polymers, grafted with maleic anhydride or glycidyl methacrylate, in which the degree of grafting is for example from 0.01% to 5% by weight:

PE, PP, copolymers of ethylene with propylene, butene, hexene or octene containing, for example, from 35% to 80% by weight of ethylene;

ethylene/alpha-olefin copolymers, such as ethylene/propylene, EPRs (abbreviation of ethylene-propylene rubbers) and ethylene-propylene-dienes (EPDMs), styrene/ethylene-butene/styrene (SEBS), styrene/butadiene/styrene (SBS), styrene/isoprene/styrene (SIS) or styrene/ethylene-propylene/styrene (SEPS) block copolymers;

copolymers of ethylene and vinyl acetate (EVA), containing up to 40% by weight of vinyl acetate;

copolymers of ethylene and alkyl (meth)acrylate, containing up to 40% by weight of alkyl (meth)acrylate;

copolymers of ethylene and vinyl acetate (EVA) and alkyl (meth)acrylate, containing up to 40% by weight of comonomers.

The functionalized polyolefin (B1) may also be chosen from ethylene/propylene copolymers, predominant in propylene, grafted by maleic anhydride then condensed with monoaminated polyamide (or a polyamide oligomer) (products described in EP-A-0342066).

The functionalized polyolefin (B1) can also be a copolymer or terpolymer of at least the following units: (1) ethylene, (2) alkyl (meth)acrylate or saturated carboxylic acid vinyl ester and (3) anhydride such as maleic anhydride or (meth)acrylic acid or epoxy, such as glycidyl (meth)acrylate.

Mention may be made, as examples of functionalized polyolefins of the latter type, of the following copolymers, where ethylene preferably represents at least 60% by weight and where the termonomer (the function) represents, for example, from 0.1% to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth)acrylic acid or maleic anhydride or glycidyl methacrylate copolymers.

In the preceding copolymers, the (meth)acrylic acid may be salified with Zn or Li.

The term "alkyl (meth)acrylate" in (B1) or (B2) denotes C1 to C8 alkyl methacrylates and acrylates and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the abovementioned polyolefins (B1) may also be crosslinked by any suitable method or agent (diepoxy, diacid, peroxide, etc.); the term functionalized polyolefin also comprises mixtures of the abovementioned polyolefins with a bifunctional reagent such as diacid, dianhydride, diepoxy, etc., capable of reacting with these polyolefins or mixtures of at least two functionalized polyolefins which may react with one another.

The abovementioned copolymers, (B1) and (B2), can be copolymerized in random or block fashion and exhibit a linear or branched structure.

The molecular weight, the MFI index and the density of these polyolefins may also vary within a broad range, which will be appreciated by those skilled in the art. MFI is the abbreviation for Melt Flow Index. It is measured according to standard ASTM 1238.

The unfunctionalized polyolefins (B2) are advantageously chosen from polypropylene homopolymers or copolymers, and any ethylene homopolymer, or copolymer of ethylene and a comonomer of higher alpha-olefin type, such as butene, hexene, octene, or 4-methyl-1-pentene. Mention may be made, for example, of PPs, high-density PEs, medium-density PEs, linear low-density PEs, low-density PEs or ultra low density PEs. These polyethylenes are known by a person skilled in the art to be produced according to a "radical" process, according to a "Ziegler" type catalysis or, more recently, according to a "metallocene" catalysis.

The functionalized polyolefins (B1) are advantageously chosen from any polymer comprising alpha-olefin units and units bearing polar reactive functions, such as epoxy, carboxylic acid or carboxylic acid anhydride functions. By way of example of such polymers, mention may be made of terpolymers of ethylene, alkyl acrylate and maleic anhydride or glycidyl methacrylate, such as Lotader® from the applicant or polyolefins grafted by maleic anhydride such as Orevac® from the applicant, and also terpolymers of ethylene, alkyl acrylate and (meth)acrylic acid. Mention may also be made of homopolymers or copolymers of polypropylene grafted by a carboxylic acid anhydride, then condensed with polyamides or monoaminated polyamide oligomers.

Although the MFI of the polyamide and the MFIs of (B1) and (B2) may be chosen within a broad range, it is nonetheless recommended, to facilitate dispersion of (B), that the MFI of the polyamide is higher than that of (B).

Regarding the Core-Shell Entity

The core-shell entity is preferably in the form of spherical polymer particles. These particles are also referred to as core-shell particles or core-shell polymers. The first layer forms the core, the second layer or all the subsequent layers form the respective shells.

As regards the spherical polymer particle, it has a weight average particle size between 20 nm and 500 nm. Preferably the weight average particle size of the polymer is between 20 nm and 400 nm, more preferably between 20 nm and 350 nm and advantageously between 20 nm and 300 nm.

The polymer particle has a multilayer structure comprising at least one layer (A) comprising a polymer (A1) having a glass transition temperature below 0° C. and another layer (B) comprising a polymer (B1) having a glass transition temperature above 60° C.

Preferably, the polymer (B1) having a glass transition temperature above 60° C. is the outer layer of the polymer particle with a multilayer structure.

The polymer particle is obtained by a process that has several steps, such as two or three steps or more.

Preferably, the polymer (A1) having a glass transition temperature below 0° C. in the layer (A) is produced during the first step of the multistep process forming the core of the polymer particle with a multilayer structure. Preferably, the polymer (A1) has a glass transition temperature below −5° C., more preferably below −15° C., advantageously below −25° C.

Preferably, the polymer (B1) having a glass transition temperature above 60° C. is produced during the last step of the multistep process forming the outer layer of the polymer particle with a multilayer structure.

One or more additional intermediate layers obtained by one or more intermediate steps may be present.

The glass transition temperature Tg of the polymer with several layers can be estimated for example by dynamic methods as thermomechanical analysis.

The polymer (A1) and the layer (A) comprise from 0% by weight to less than 50% by weight of monomers containing aromatic groups. The polymer (B1) and the layer (B) comprise from 0% by weight to less than 50% by weight of monomers containing aromatic groups.

According to one embodiment, the polymer (B1) and the layer (B) do not comprise monomers containing aromatic groups.

As regards the polymer (A1) having a glass transition temperature below 0° C., it comprises at least 50% by weight of polymer units derived from isoprene or butadiene and the layer (A) is the innermost layer of the polymer particle with a multilayer structure. In other words, the layer (A) comprising the polymer (A1) is the core of the polymer particle.

By way of example, the polymer (A1) of the core may consist of isoprene homopolymers or butadiene homopolymers, isoprene/butadiene copolymers, isoprene copolymers with at most 98% by weight of a vinyl monomer and butadiene copolymers with at most 98% by weight of a vinyl monomer. The vinyl monomer may be styrene, an alkylstyrene, acrylonitrile, an alkyl (meth)acrylate or butadiene or isoprene or mixtures thereof, as long as the polymer (A1) comprises less than 50% by weight of monomers containing aromatic groups.

The polymer (A1) may be crosslinked. Crosslinking monomers of use in the present invention comprise, without being limited thereto, polyfunctional vinylaromatic compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di- and triallyl compounds such as diallyl phthalate, diallyl sebacate and triallyl triazine.

According to one embodiment, the core is a butadiene homopolymer.

According to another embodiment, the core is a butadiene/styrene copolymer.

More preferably, the glass transition temperature Tg of the polymer (A1) comprising at least 50% by weight of polymeric units derived from isoprene or from butadiene is between −100° C. and 10° C., even more preferably between −80° C. and 0° C. and advantageously between −70° C. and −20° C.

Regarding the polymer (B1), mention may be made of homopolymers and copolymers formed from monomers containing double bonds and/or vinyl monomers. Preferably, the polymer (B1) is a (meth)acrylic polymer.

Preferably, the polymer (B1) comprises at least 70% by weight of monomers chosen from C1 to C12 alkyl (meth) acrylates. Even more preferably, the polymer (B1) comprises at least 80% by weight of C1 to C4 alkyl methacrylate monomers and/or of C1 to C8 alkyl acrylate monomers.

Most preferably of all, the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as the polymer (B1) has a glass transition temperature of at least 60° C.

The polymer (B1) may comprise functional monomers chosen from glycidyl (meth)acrylate, acrylic or methacrylic acid, amides derived from these acids, such as for example dimethylacrylamide, 2-methoxyethyl acrylate or methacrylate, 2-aminoethyl acrylates or methacrylates and mixtures thereof.

Advantageously, the polymer (B1) comprises at least 70% by weight of monomer units originating from methyl methacrylate.

Preferably, the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably, the polymer (B1) is grafted to the polymer produced in the preceding step.

According to certain embodiments, the polymer (B1) is crosslinked.

The core-shell entity may be obtained by a multi-step process, comprising at least two steps. Such a process is described for example in documents US 2009/0149600 or EP0722961.

Preferably, the polymer (A1) having a glass transition temperature below 0° C. produced during step (A) is the first step of the multi-step process.

The weight ratio ra of the polymer (A1) of the layer included in step (A) relative to the complete multilayer polymer is at least 60% by weight, preferably at least 70% by weight, more preferably at least 75% by weight.

The weight ratio rb of the polymer (B1) of the outer layer included in step (B) relative to the complete multilayer polymer is at least 5% by weight, preferably at least 6% by weight, more preferably at least 7% by weight.

According to the invention, the ratio rb between the outer layer (B) comprising the polymer (B1) and the complete multilayer polymer is at most 30% by weight.

Preferably, the ratio between the polymer (B1) and the complete multilayer polymer is between 5% by weight and 30% by weight.

Regarding (C):

The additive is chosen from stabilizers, dyes, plasticizers, fibers, fillers, processing aids or a mixture thereof.

By way of example, the stabilizer may be a UV stabilizer, an organic stabilizer or more generally a combination of organic stabilizers, such as an antioxidant of phenol type (for example of the type of that of Irganox 245 or 1098 or 1010 from Ciba-BASF), an antioxidant of phosphite type (for example Irgafos® 126 from Ciba-BASF) and even optionally other stabilizers, such as a HALS, which means Hindered Amine Light Stabilizer (for example Tinuvin 770 from Ciba-BASF), a UV absorber (for example Tinuvin 312 from Ciba), or a phosphorus-based stabilizer. Use may also be made of antioxidants of amine type, such as Naugard 445 from the company Crompton or else polyfunctional stabilizers, such as Nylostab S-EED from the company Clariant.

This stabilizer may also be an inorganic stabilizer, such as a copper-based stabilizer. By way of example of such inorganic stabilizers, mention may be made of copper acetates and halides. Incidentally, other metals, such as silver, can optionally be considered, but said metals are known to be less effective. These copper-based compounds are typically combined with halides of alkali metal, in particular potassium.

By way of example, the plasticizers are chosen from benzenesulfonamide derivatives, such as n-butylbenzenesulfonamide (BBSA); ethyltoluenesulfonamide or N-cyclohexyltoluenesulfonamide; esters of hydroxybenzoic acids, such as 2-ethylhexyl para-hydroxybenzoate and 2-decylhexyl para-hydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

It would not be outside the scope of the invention to use a mixture of plasticizers.

By way of example, the fibers may be chosen from aramid fibers, glass fibers, carbon fibers, advantageously glass fibers or carbon fibers.

By way of example, the fillers may be chosen from silica, graphite, expanded graphite, carbon black, glass beads, kaolin, magnesia, slag, talc, wollastonite, nanofillers (carbon nanotubes), pigments, metal oxides (titanium oxide), metals, advantageously wollastonite and talc, preferentially talc.

In one embodiment, the present invention relates to a composition as defined above, said composition being free of PEBA.

Advantageously, the flexural modulus is greater than 900 MPa as determined according to the standard ISO 178: 2010.

In one embodiment, the present invention relates to a composition as defined above, said composition being characterized in that said semicrystalline polyamide is compatible with said amorphous PA.

The expression "said semicrystalline polyamide is compatible with said amorphous PA" means that, said semicrystalline PA having a Tg1 and said amorphous PA having a Tg2, the mixture of these two PAs will have two Tg values, the position of these two Tg values will depend on the contents of semicrystalline PA and amorphous PA.

Advantageously, the two polyamides should also be miscible with one another.

In this case, only a single Tg value is observed, the position of which is given by the following formula: $Tg_{final} = (\alpha_1/Tg_1 + \alpha_2/Tg_2)^{-1}$ in which $\alpha_1$ and $\alpha_2$ represent the weight percentages of each PA.

In one embodiment, the present invention relates to a composition as defined above, said composition being characterized in that (B) is an impact modifier and said composition is substantially devoid of transparency.

The expression "substantially devoid of transparency" means that the composition has a transparency such that the transmittance at 560 nm on a sheet 2 mm thick is less than 75%, determined in accordance with standard ISO 13468-2: 2006.

In this embodiment, the fact of using an impact modifier actually makes the composition devoid of transparency.

In one embodiment, the present invention relates to a composition as defined above, said composition being characterized in that (B) is a core-shell entity and said composition is transparent.

The term "transparent", as used, means that the composition has a transparency such that the transmittance at 560 nm on a sheet 2 mm thick is greater than 75%, determined in accordance with standard ISO 13468-2: 2006.

In this embodiment, the fact of using a core-shell entity makes it possible either to preserve the transparency, or to make said composition transparent.

In one embodiment, the present invention relates to a composition as defined above, said composition being characterized in that (B) is a mixture of impact modifier and of core-shell entity and said composition is substantially devoid of transparency.

The weight proportion of impact modifier and of core-shell entity is from 0.1/99.9 to 99.9/0.1.

Advantageously, the semicrystalline polyamide in (A) is present in the composition of the invention in a proportion of from 40% to 70%, in particular from 50% to 65% and the amorphous polyamide is respectively present at from 30% to 60%, in particular from 35% to 50%.

Advantageously, the amorphous polyamide (or when the composition comprises a mixture of amorphous polyamides, at least one of the amorphous polyamides, or even each of the amorphous polyamides) comprises at least one unit corresponding to the formula (Ca diamine).(Cb diacid) where the Ca diamine is as defined above and Cb is an aliphatic diacid (in particular as defined above), the semicrystalline polyamide (or when the composition comprises a mixture of semicrystalline polyam ides, at least one of the semicrystalline polyamides, or even each of the semicrystalline polyamides) being chosen from any one of the polyamides defined above. This amorphous polyamide may be a homopolyamide or a copolyamide.

For example, the Ca diamine is chosen from decanediamine (a=10), dodecanediamine (a=12), PACM and MACM and/or the Cb diacid is chosen from sebacic acid (b=10), dodecanedioic acid (b=12), tetradecanedioic acid (b=14) and octadecanoic acid (b=18).

Preferably, the amorphous polyamide (or when the composition comprises a mixture of amorphous polyamides, at least one of the amorphous polyamides, or even each of the amorphous polyamides), when it is a homopolyamide, is PA MACM.10, PA PACM.10, PA MACM.12, PA PACM.12, PA MACM.14, PA PACM.14, PA MACM.18, PA PACM.18 and, when it is a copolyamide, is PA 11/MACM.10, PA 11/PACM.10, PA 11/MACM.12, PA 11/PACM.12, PA 11/MACM.14, PA 11/PACM.14, PA 11/MACM.18, PA 11/PACM.18, PA 12/MACM.10, PA 12/PACM.10, PA 12/MACM.12, PA 12/PACM.12, PA 12/MACM.14, PA 12/PACM.14, PA 12/MACM.18, PA 12/PACM.18, PA 10.10/MACM.10, PA10.10/PACM.10, PA 10.10/MACM.12, PA 10.10/PACM.12, PA 10.10/MACM.14, PA 10.10/PACM.14, PA 10.10/MACM.18, PA 10.10/PACM.18, PA 10.12/MACM.10, PA 10.12/PACM.10, PA 10.12/MACM.12, PA 10.12/PACM.12, PA 10.12/MACM.14, PA 10.12/PACM.14, PA 10.12/MACM.18, PA 10.12/PACM.18, PA, 12.10/MACM.10, PA 12.10/PACM.10, PA 12.10/MACM.12, PA 12.10/PACM.12, PA 12.10/MACM.14, PA 12.10/PACM.14, PA 12.10/MACM.18, PA 12.10/PACM.18, PA 12.12/MACM.10, PA 12.12/PACM.10, PA 12.12/MACM.12, PA 12.12/PACM.12, PA 12.12/MACM.14, PA 12.12/PACM.14, PA 12.12/MACM.18, PA 12.12/PACM.18, PA 10.14/PACM.10, PA 10.14/MACM.12, PA 10.14/PACM.12, PA 10.14/MACM.14, PA 10.14/PACM.14, PA 10.14/MACM.18, PA 10.14/PACM.18, PA 12.14/MACM.10, PA 12.14/PACM.10, PA 12.14/MACM.12, PA 12.14/PACM.12, PA 12.14/MACM.14, PA 12.14/PACM.14, PA 12.14/MACM.18, PA 12.14/5 PACM.18, PA PACM.10/MACM.10, PA PACM.12/MACM.12, PA PACM.14/MACM.14, PA 11/PACM.10/MACM.10, PA 11/PACM.12/MACM.12, PA 11/PACM.14/MACM.14, PA 12/PACM.10/MACM.10, PA 12/PACM.12/MACM.12, or PA 12/PACM.14/MACM.14.

In one embodiment, the amorphous polyamide (or when the composition comprises a mixture of amorphous polyamides, at least one of the amorphous polyamides, or even each of the amorphous polyamides) comprises at least one unit corresponding to the formula (Ca diamine).(Cb diacid) where the Ca diamine is cycloaliphatic (in particular as defined above) and the Cb diacid is as defined above, the semicrystalline polyamide (or when the composition comprises a mixture of semicrystalline polyamides, at least one of the semicrystalline polyamides, or even each of the semicrystalline polyamides) being chosen from any one of the polyamides defined above. For example, the Ca diamine is PACM or MACM and/or the Cb diacid is chosen from sebacic acid (b=10), dodecanedioic acid (b=12), tetradecanedioic acid (b=14) and octadecanoic acid (b=18). This amorphous polyamide (or when the composition comprises a mixture of amorphous polyamides, at least one of the amorphous polyamides, or even each of the amorphous polyamides) may be a homopolyamide or a copolyamide.

Preferably, the amorphous polyamide (or when the composition comprises a mixture of amorphous polyamides, at least one of the amorphous polyamides, or even each of the amorphous polyamides), when it is a homopolyamide, is PA MACM.10, PA PACM.10, PA MACM.12, PA PACM.12, PA MACM.14, PA PACM.14, PA MACM.18, PA PACM.18 and, when it is a copolyamide, is PA 11/MACM.10, PA 11/PACM.10, PA 11/MACM.12, PA 11/PACM.12, PA 11/MACM.14, PA 11/PACM.14, PA 11/MACM.18, PA 11/PACM.18, PA 12/MACM.10, PA 12/PACM.10, PA 12/MACM.12, PA 12/PACM.12, PA 12/MACM.14, PA 12/PACM.14, PA 12/MACM.18, PA 12/PACM.18, PA 10.10/MACM.10, PA10.10/PACM.10, PA 10.10/MACM.12, PA 10.10/PACM.12, PA 10.10/MACM.14, PA 10.10/PACM.14, PA 10.10/MACM.18, PA 10.10/PACM.18, PA 10.12/MACM.10, PA 10.12/5 PACM.10, PA 10.12/MACM.12, PA 10.12/PACM.12, PA 10.12/MACM.14, PA 10.12/PACM.14, PA 10.12/MACM.18, PA 10.12/PACM.18, PA 12.10/MACM.10, PA 12.10/PACM.10, PA 12.10/MACM.12, PA 12.10/PACM.12, PA 12.10/MACM.14, PA 12.10/PACM.14, PA 12.10/MACM.18, PA 12.10/PACM.18, PA 10 12.12/MACM.10, PA 12.12/PACM.10, PA 12.12/MACM.12, PA 12.12/PACM.12, PA 12.12/MACM.14, PA 12.12/PACM.14, PA 12.12/MACM.18, PA 12.12/PACM.18, PA 10.14/PACM.10, PA 10.14/MACM.12, PA 10.14/PACM.12, PA 10.14/MACM.14, PA 10.14/PACM.14, PA 10.14/MACM.18, PA 10.14/PACM.18, PA 12.14/MACM.10, PA 12.14/PACM.10, PA 12.14/MACM.12, PA 12.14/PACM.12, PA 12.14/MACM.14, PA 12.14/PACM.14, PA 12.14/MACM.18, PA 12.14/PACM.18, PA PACM.10/MACM.10, PA PACM.12/MACM.12, PA PACM.14/MACM.14, PA 11/PACM.10/MACM.10, PA 11/PACM.12/MACM.12, PA 11/PACM.14/MACM.14, PA 12/PACM.10/MACM.10, PA 12/PACM.12/MACM.12, PA 12/PACM.14/MACM.14.

In one embodiment, the amorphous polyamide (or when the composition comprises a mixture of amorphous polyamides, at least one of the amorphous polyamides, or even each of the amorphous polyamides) comprises at least one unit corresponding to the formula (Ca diamine).(Cb diacid) where the Ca diamine is cycloaliphatic (in particular as defined above) and the Cb diacid is an aromatic diacid (in particular as defined above), the semicrystalline polyamide (or when the composition comprises a mixture of semicrystalline polyamides, at least one of the semicrystalline polyamides, or even each of the semicrystalline polyam ides) being chosen from any one of the polyamides defined above. For example, the Ca diamine is PACM or MACM and/or the Cb diacid is terephthalic acid or isophthalic acid. This amorphous polyamide may be a homopolyamide or a copolyamide. Preferably, the amorphous polyamide (or when the composition comprises a mixture of amorphous polyamides, at least one of the amorphous polyamides, or even each of the amorphous polyamides) is PA MACM.I, PA PACM.I, PA MACM.I/MACM.T, PA PACM.I/PACM.T, PA 12/MACM.I, PA 12/PACM.I, PA 12/MACM. I/MACM.T, PA 12/PACM. I/PACM.T, PA 11/MACM. I, PA 11/PACM. I, PA 11/MACM.I/MACM.T, PA 11/PACM.I/PACM.T, 10.10/MACM. I, 10.10/PACM. I, PA 10.10/MACM.I/MACM.T, 10.10/PACM.I/PACM.T, 10.12/MACM. I, 10.12/PACM. I, PA 10.12/MACM.I/MACM.T, 10.12/PA PACM.I/PACM.T, 12.10/MACM. I, 12.10/PA PACM.I, PA 12.10/MACM.I/MACM.T, 12.10/PACM. I/PACM.T, 12.12/MACM. I, 12.12/PACM. I, PA 12.12/MACM. I/MACM.T, 12.12/PACM. I/PACM.T, 12.14/MACM. I, 12.14/PACM. I, PA 12.14/MACM. I/MACM.T, 12.14/PACM. I/PACM.T, 10.14/MACM. I, 10.14/PACM. I, PA 10.14/MACM.I/MACM.T or 10.14/PACM.UPACM.T.

Advantageously, the semicrystalline polyamide of the composition defined above is an aliphatic polyamide, in particular chosen from PA11, PA12, PA1010, PA1012, especially PA11.

In one embodiment, the present invention relates to a composition as defined above, wherein the amorphous polyamide is a polyamide of formula $B/X_1Y_1$ wherein:

B is an aliphatic repeating unit chosen from a unit obtained from the polycondensation of at least one amino acid, a unit obtained from the polycondensation of at least one lactam and a unit obtained from the polycondensation of at least one aliphatic diamine and of at least one aliphatic diacid, $X_1$ is a cycloaliphatic diamine, and $Y_1$ is a dicarboxylic acid, said diacid being chosen from an aliphatic diacid, a cycloaliphatic diacid and an aromatic diacid, said diamine and said diacid comprising from 4 to 36 carbon atoms, advantageously from 6 to 18 carbon atoms.

The various constituents B, $X_1$ and $X_2$ of the polyamide of formula $B/X_1Y_1$ above have the same definitions as, respectively, for the units A, X and Y of the composition above.

Advantageously, the polyamide of formula $B/X_1Y_1$ is as defined above when the latter corresponds to a copolyamide.

Advantageously, the present invention relates to a composition as defined above, wherein the amorphous polyamide is chosen from 11/B10, 12/B10, 11/BI/BT, 11/BI, especially 11/B10.

Advantageously, the present invention relates to a composition as defined above, wherein the aliphatic polyamide is PA11 and the amorphous polyamide is 11/B10.

Advantageously, the present invention relates to a composition as defined above, wherein the impact modifier is chosen from a polyolefin or a mixture of several polyolefins, in particular the polyolefin or the mixture of polyolefins bears a function chosen from maleic anhydride, carboxylic acid, carboxylic anhydride and epoxide functions, and is in particular chosen from ethylene/octene copolymers, ethylene/butene copolymers, ethylene/propylene elastomers (EPRs), ethylene-propylene-diene copolymers of elastomeric nature (EPDMs) and ethylene/alkyl (meth)acrylate copolymers.

In one advantageous embodiment, the present invention relates to a composition as defined above, wherein Z=0.

In one advantageous embodiment, the present invention relates to a composition as defined above, wherein (B) is an impact modifier in a proportion of from more than 10% to 20%, in particular from 11% to 20%.

In one advantageous embodiment, the present invention relates to a composition as defined above, wherein Z=0 and (B) is an impact modifier in a proportion of from more than 10% to 20%, in particular from 11% to 20%.

In one embodiment, the present invention relates to a composition as defined above, wherein the amorphous polyamide is a polyamide of formula $B/X_1Y_1$ wherein:

B is an aliphatic repeating unit chosen from a unit obtained from the polycondensation of at least one amino acid, a unit obtained from the polycondensation of at least one lactam and a unit obtained from the polycondensation of at least one aliphatic diamine and of at least one aliphatic diacid, $X_1$ is a cycloaliphatic diamine, and $Y_1$ is a dicarboxylic acid, said diacid being chosen from an aliphatic diacid, a cycloaliphatic diacid and an aromatic diacid, said diamine and said diacid comprising from 4 to 36 carbon atoms, advantageously from 6 to 18 carbon atoms, said polyamide of formula $B/X_1Y_1$ being as defined above when the latter corresponds to a copolyamide, said semicrystalline polyamide being an aliphatic polyamide, in particular chosen from PA11, PA12, PA1010, PA1012, especially PA11, Z being equal to 0, said constituent (B) of the composition being an impact modifier, especially in a proportion of from more than 10% to 20%, in particular from 11% to 20%, and said composition being devoid of transparency.

In one advantageous embodiment, the present invention relates to a composition as defined above, wherein Z is equal to 0, said constituent (B) of the composition being an impact modifier, especially in a proportion of from more than 10% to 20%, in particular from 11% to 20%, said composition comprising:

(A) 75% to 90%, (B) more than 10% to 20%, in particular from 11% to 20%, (C) 0.1% to 5%, the sum A+B+C being equal to 100%.

In one advantageous embodiment, the present invention relates to a composition as defined above, wherein the semicrystalline polyamide and/or the amorphous polyamide is (are) partially or completely biobased.

The term "bio-based" being understood within the meaning of standard ASTM D6852-02 and, more preferentially, within the meaning of standard ASTM D6866.

Standard ASTM D6852 indicates the portion of products of natural origin in the composition whereas standard ASTM D6866 specifies the method and the conditions for measuring the renewable organic carbon, i.e. that is derived from biomass.

According to another aspect, the present invention relates to the use of a composition as defined above, for the manufacture of articles obtained by extrusion, injection molding, molding or thermoforming.

All the technical features given in detail above for the composition as is are valid for the use thereof.

In one advantageous embodiment, the present invention relates to the use of a composition as defined above, for the manufacture of articles obtained by injection molding, chosen from a sports article, especially a ski boot or a part of a ski boot or a rigid boot with studs, such as a soccer, rugby or American football boot, a hockey boot or a part of a hockey boot, or a running shoe, a golf ball or a part of a golf ball, or a lacrosse stick, a hockey article such as a helmet, etc. and sports articles for protecting the head, shoulders, elbows, hands, knees, back or shin, such as a helmet, gloves, shoulder pads, elbow pads, knee pads or shin pads.

In one advantageous embodiment, the present invention relates to the use of a composition as defined above, for the manufacture of articles obtained by injection molding which are optical articles, in particular glasses or goggles, especially glasses or goggles used when playing a sport such as protective glasses or ski goggles.

In one advantageous embodiment, the present invention relates to the use of a composition as defined above, for the manufacture of articles obtained by extrusion such as films.

In one advantageous embodiment, the present invention relates to the use of a composition as defined above, for thermoforming an article, especially a part of a ski boot or rollerblade or hockey boot, especially of a ski boot, or glasses or goggles, especially sports glasses or goggles, in particular protective glasses or ski goggles.

According to another aspect, the present invention relates to a process for preparing a composition as defined above, comprising a step of melt blending the constituents (A), (B) and (C), in an extruder, at a temperature between 230° C.

and 330° C., in order afterwards to obtain granules, which granules will subsequently be injected, at a temperature of between 230° C. and 330° C., onto an injection-molding machine so as to obtain the desired articles.

All the technical features given in detail above for the composition as is are valid for the process.

According to another aspect, the present invention relates to a fashioned article, such as fiber, fabric, film, sheet, rod, tube or injection-molded part, in particular substantially devoid of transparency, comprising the composition as defined above, which can be produced in the form of a dry mixture or after compounding on an extruder.

All the technical features given in detail above for the composition as is are valid for the article.

In one advantageous embodiment, the present invention relates to an article as defined above, characterized in that it consists of a sports article, especially a ski boot or a part of a ski boot or a rigid boot with studs, such as a soccer, rugby or American football boot, a hockey boot or a part of a hockey boot, or a running shoe, a golf ball or a part of a golf ball, or a lacrosse stick, or else a hockey article such as a helmet or sports articles for protecting the head, shoulders, elbows, hands, knees, back or shin, such as a helmet, gloves, shoulder pads, elbow pads, knee pads or shin pads.

In one advantageous embodiment, the present invention relates to an article as defined above, characterized in that it consists of an optical article, in particular glasses or goggles, especially glasses or goggles used when playing a sport such as protective glasses or ski goggles.

EXAMPLES

Example 1: 11/B10 and PA11 Mixtures

Composition of the invention (see table I):
The proportions are indicated by weight.

Example 2: Ductile-Brittle Transition

The ductile-brittle transition was determined according to the standard ISO 179 1 eA.

The $T_{DB}$ of the composition of the invention (I 1: invention 1) is below −20° C. (ductile behavior for T≥−20° C.).

The $T_{DB}$ of the composition of the invention (I 2: invention 2) is between −10° C. and −20° C.

The $T_{DB}$ of the composition C 1: comparative 1 is approximately equal to 15-20° C.

Figure 2:
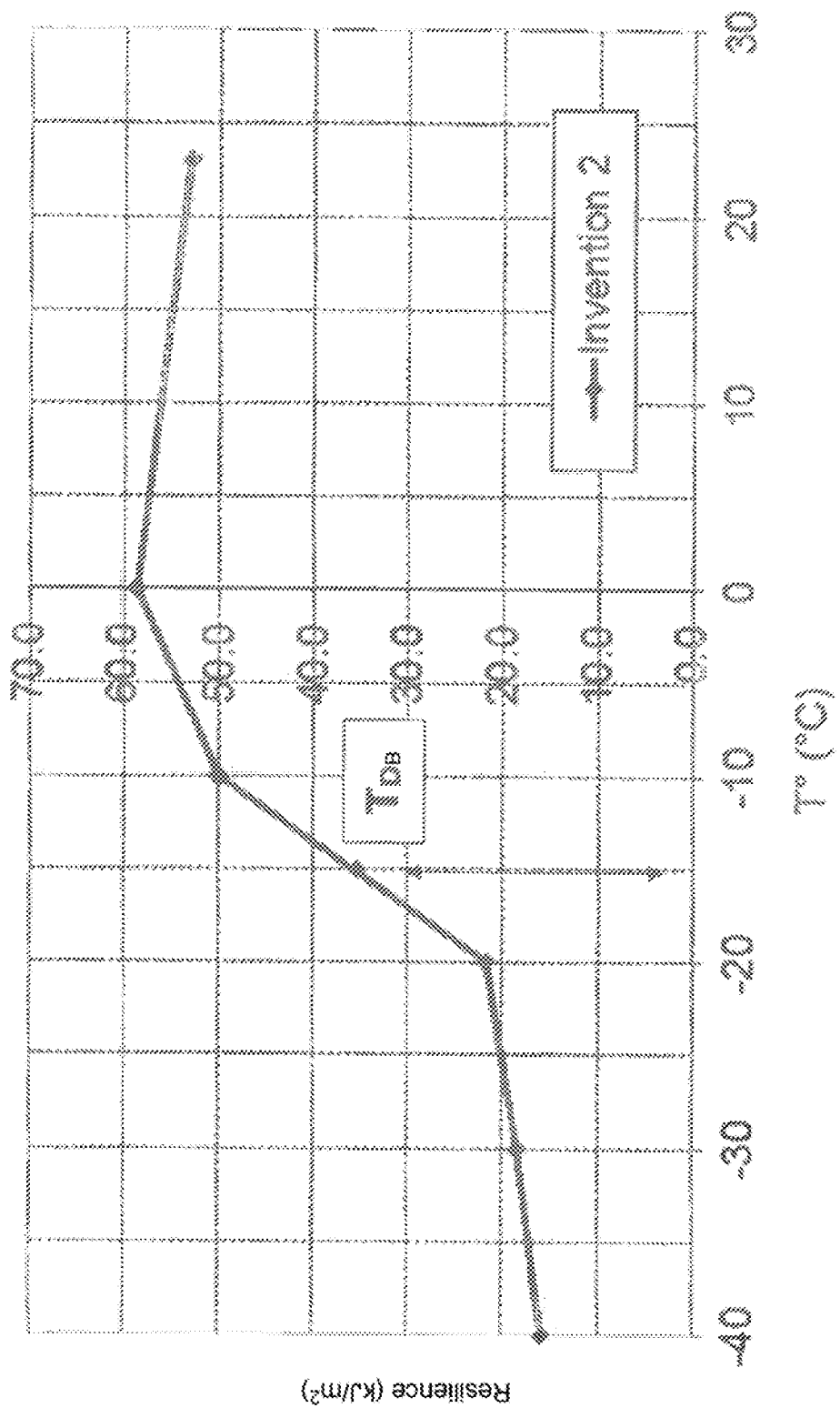
FIG. 2 presents the ductile-brittle transition ($T_{DB}$) of the composition of the invention (invention 2) (notched and conditioned bars).
x-axis: temperature in ° C.
y-axis: Resilience (kJ/m$^2$)
Figure 3:
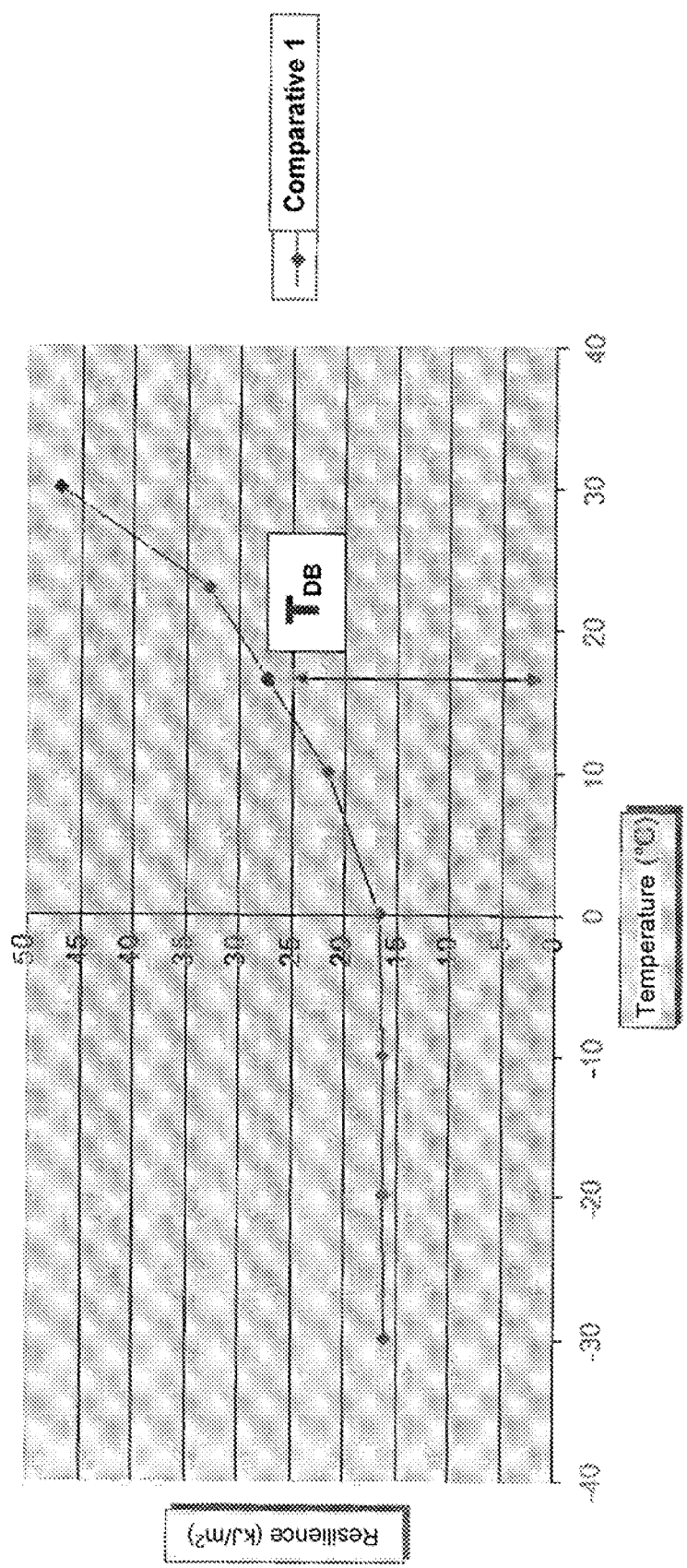
FIG. 3 presents the ductile-brittle transition ($T_{DB}$) of the comparative composition 1.
x-axis: temperature in ° C.
y-axis: Resilience (kJ/m$^2$)

See FIGS. 1 to 3 and table II.

Example 3: Notch Sensitivity (Three Point Bending with Thin Notch)

The notch sensitivity was evaluated at −10° C., −20° C. and −30° C. at a speed of 2000 mm/min via a three-point bending test on notched bars (internal ARKEMA method after conditioning for 15 days at 23° C., with a relative humidity of 50%).

The compositions of the invention I 1 (invention 1), I 3 (invention 3) and I 4 (invention 4) exhibit ductile behavior at −30° C. at a speed of 2000 mm/min.

The composition of the invention I 2 (invention 2) exhibits ductile behavior at −20° C. at a speed of 2000 mm/min.

The comparative composition C 1 (comparative 1) is brittle at −20° C. at a speed of 2000 mm/min.

Example 4: Ross Flex with and without V-Notch

Number of cycles: 250 000
Temperature: −10° C.
Bending frequency: 100 cycles/min
Flexing angle: 60°
Conditioning of the test specimens: 7 days at 70° C.

| Constituents | C 1 | C 2 | C 3 | I 1 | I 2 | I 3 | I 4 | I 5 | I 6 | I 7 |
|---|---|---|---|---|---|---|---|---|---|---|
| 11/B10 (0.25/1 molar ratio) | — | 43 | 17.5 | 39.80 | 39.80 | 26 | 30 | 42.5 | 54.5 | 38 |
| Fusabond ® 493 | — | — | — | — | 12 | — | — | — | — | — |
| Irgafos ® 126 | 0.2 | — | — | 0.2 | 0.2 | — | — | — | — | — |
| Irganox ® 245 | 0.1 | — | — | 0.1 | 0.1 | — | — | — | — | — |
| PA 11 | 84.7 | 53 | 82.5 | 47.90 | 47.90 | 60 | 57 | 42.5 | 38 | 54.5 |
| Tafmer MH5020 | — | 4 | 2 | 12 | — | 14 | 13 | 15 | 7.5 | 7.5 |
| PEBAX (50% PA11 (1000) + 50% PTMG (1000)) | 15 | — | — | — | — | — | — | — | — | — |

C = Comparative
I = Invention
Fusabond ® 493 is a polyolefin of elastomer type (maleicized ethylene-octene) sold by DuPont.
Irgafos ® 126 is a phosphite-based antioxidant sold by Ciba-BASF.
Irganox ® 245 is a phenol-type antioxidant sold by Ciba-BASF.
Tafmer MH5020 is a functionalized polyolefin sold by Mitsui Chemicals.

The flexural modulus according to ISO 178: 2010 (after conditioning for 15 days at 23° C., 50% relative humidity) was determined and is presented in table II:

Notch: on only 1 side (V-shaped, depth 1 mm, notch tip radius 0.25 mm).

After 250 000 cycles with notch, the formulations of the invention I 1 (invention 1), I 3 (invention 3) and I 4

TABLE II

| Constituents | C 1 | C 2 | C 3 | I 1 | I 2 | I 3 | I 4 | I 5 | I 6 | I 7 |
|---|---|---|---|---|---|---|---|---|---|---|
| Flexural modulus ISO 178: 2010 (MPa) | 850 | — | — | 1090 | 1110 | 920 | 990 | 1050 | 1300 | 1200 |
| $T_{DB}$ (° C.) | 17 | 30 | 30 | <−20 | −10 to −20 | −30 | −27.5 | −32.5 | −7.5 | −5 |

(invention 4) exhibit cracked zones starting from the notch. Nevertheless, the bar is not broken.

After 250 000 cycles without notch, the formulations of the invention I 1 (invention 1), I 3 (invention 3) and I 4 (invention 4) have neither broken nor cracked.

Example 5: Thermoforming

The thermoforming tests were carried out with the composition of the invention I 1 (invention 1) on extruded sheets 2 mm thick with a yoghurt pot type mold. The depth was set at 3 cm. The temperature of the sheet was varied before the forming cycle.

Figure 4:
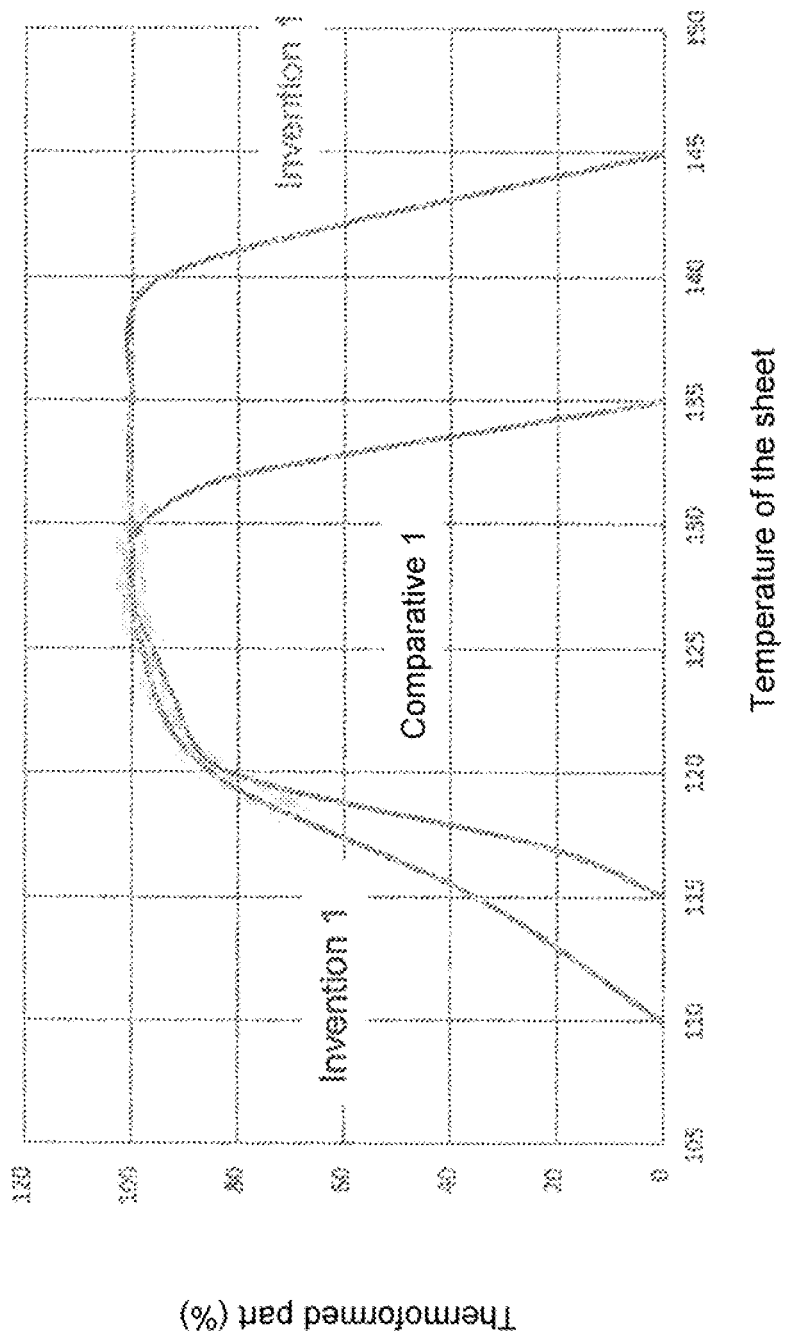
FIG. 4 presents the tests for thermoforming the composition of the invention (invention 1) and the comparative composition (comparative 1) of example 5.
y-axis: Part formed (in %)
x-axis: Temperature

The results are presented in FIG. 4.

The processability window is broader for the composition of the invention.

Comparative composition: 8° C.
Composition of the invention: 15° C.

The formability of the composition of the invention was also evaluated by DMA (Dynamical Mechanical analysis).
Device: DMA Q800-2
Tool: Tension on bars 2 mm wide and 0.5 mm thick.
Test protocol:
Start of the test at 23° C. with a slight deformation of 0.1%.
A rapid temperature rise is performed.
At T=90° C., a deformation is applied (5% or 10%).
5 min isotherm (still at a deformation of 5% or 10%).
5° C./min cooling down to 23° C. while maintaining the deformation at 5% or 10%.
At 23° C., the stress is released.
The residual deformation is measured.
The higher this residual deformation remains, the greater the formability of the material.

Figure 5:
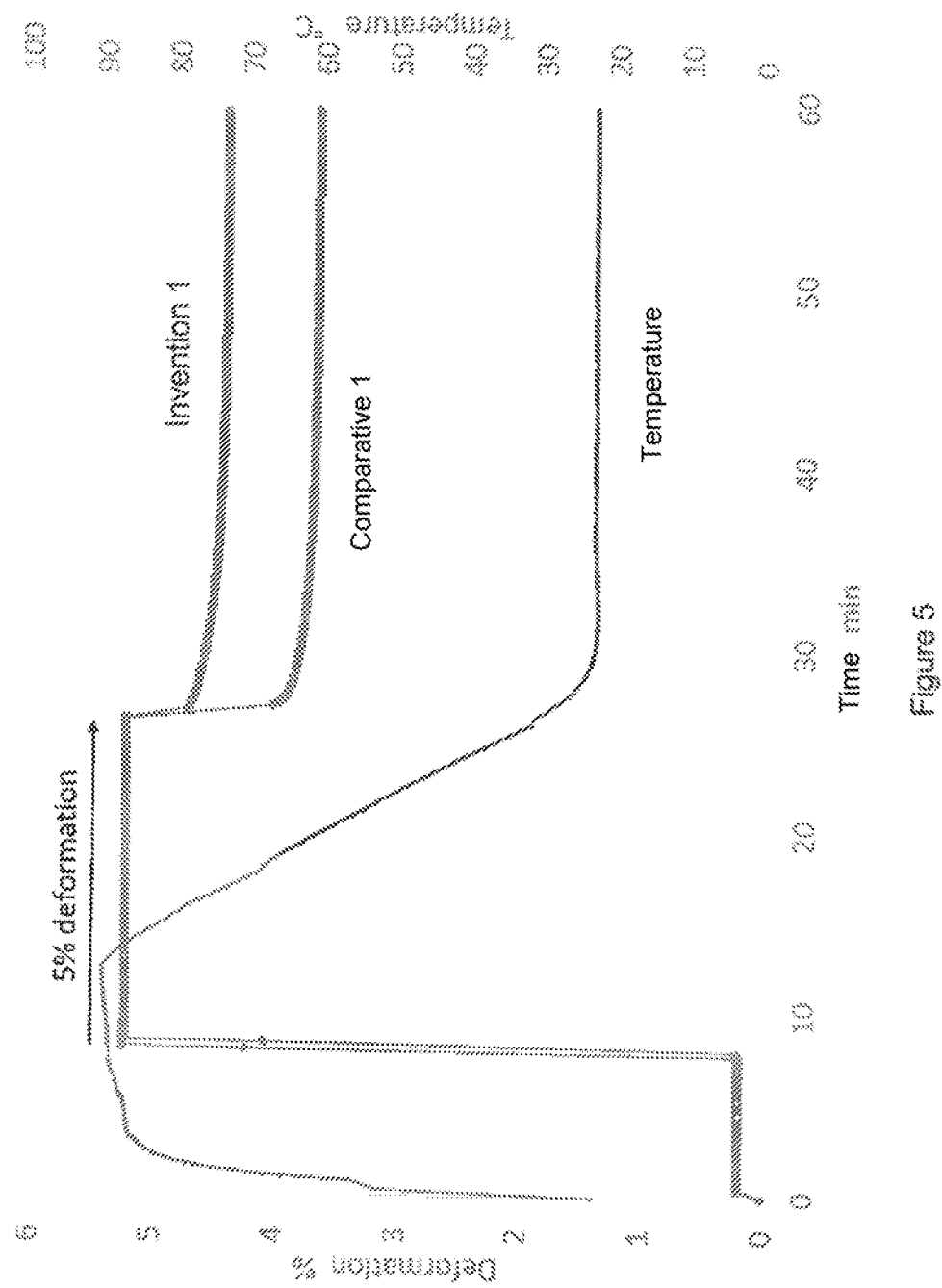
FIG. 5 presents the formability of the composition of the invention (invention 1). This ability was evaluated by DMA (Dynamical Mechanical Analysis) at 5% deformation.
Left y-axis: Deformation (%)
Right y-axis: Temperature (° C.)
x-axis: time (minutes)

The results are presented in FIG. 5 and FIG. 6.

The invention claimed is:

1. A composition comprising, by weight, the total being equal to 100%:
(A) 65% to 93% of a polyamide mixture comprising from:
40% to 70% by weight of at least one semicrystalline polyamide, of which the mean number of carbon atoms relative to the nitrogen atom is greater than 9, said semicrystalline polyamide being of formula A/Z wherein,
A is an aliphatic repeating unit chosen from a unit obtained from the polycondensation of at least one amino acid, a unit obtained from the polycondensation of at least one lactam and a unit X.Y obtained from the polycondensation:
of at least one diamine, said diamine being a linear or branched aliphatic diamine, or a mixture thereof, and
of at least one dicarboxylic acid, said diacid being a linear or branched aliphatic diacid,
said diamine and said diacid comprising from 4 to 36 carbon atoms, and
Z represents another aliphatic repeating unit different from A and is included from 0 to 20%;
30% to 60% by weight of at least one amorphous polyamide,
(B) 7% to 30% of one or more impact modifier(s),
(C) 0 to 5% of at least one additive chosen from stabilizers, dyes, plasticizers, fibers, fillers, processing aids or a mixture thereof,
said amorphous polyamide being in a sufficient proportion so that the composition is sufficiently ductile at low temperature, and rigid, and has a ductile-brittle transition temperature $(T_{BD})<0°$ C. as determined according to the standard ISO 179 1 eA and a flexural modulus of greater than 900 MPa as determined according to the standard ISO 178: 2010, and said composition being free of polyethylene-block-amide (PEBA).

2. The composition as claimed in claim 1, wherein in that said semicrystalline PA is compatible with said amorphous PA.

3. The composition as claimed in either of claim 1, wherein said composition is substantially devoid of transparency.

4. The composition as claimed in claim 1, wherein said impact (B) comprises a core-shell impact modifier, and said composition is transparent.

5. The composition as claimed in claim 1, wherein the semicrystalline polyamide is an aliphatic semicrystalline polyamide.

6. The composition as claimed in claim 5, wherein the aliphatic semicrystalline polyamide is chosen from PA11, PA12, PA1010, and PA1012.

7. The composition as claimed in claim 5, wherein the aliphatic semicrystalline polyamide is PA11 and the amorphous polyamide is 11/B10.

8. The composition as claimed in claim 1, wherein the amorphous polyamide is a polyamide of formula $B/X_1Y_1$ wherein:
B is an aliphatic repeating unit chosen from a unit obtained from the polycondensation of at least one amino acid, a unit obtained from the polycondensation of at least one lactam and a unit obtained from the polycondensation of at least one aliphatic diamine and of at least one aliphatic diacid,
$X_1$ is a cycloaliphatic diamine, and
$Y_1$ is a dicarboxylic acid, said diacid being chosen from an aliphatic diacid, a cycloaliphatic diacid and an aromatic diacid,
said diamine $X_1$ and said diacid $Y_1$ comprising from 4 to 36 carbon atoms.

9. The composition as claimed in claim 8, wherein the amorphous polyamide is chosen from 12/B10, and 11/B10.

10. The composition as claimed in claim 1, wherein the impact modifier is chosen from a polyolefin or a mixture of several polyolefins.

11. The composition as claimed in claim 10, wherein the polyolefin or the mixture of polyolefins is selected from the group consisting of polyolefins that bear a function chosen from maleic anhydride, carboxylic acid, carboxylic anhydride and epoxide functions; ethylene/octene copolymers, ethylene/butene copolymers, ethylene/propylene elastomers (EPRs), ethylene-propylene-diene copolymers of elastomeric nature (EPDMs) and ethylene/alkyl (meth)acrylate copolymers.

12. The composition as claimed in claim 1, wherein Z=0.

13. The composition as claimed in claim 12, wherein said impact modifier (B) is in a proportion of from 10% to 20%.

14. The composition as claimed in claim 12, comprising:
(A) 75% to 89.9%,
(B) 10% to 20%,
(C) 0.1% to 5%,
the sum A+B+C being equal to 100%.

15. The composition as claimed in claim 14, wherein the semicrystalline polyamide and/or the amorphous polyamide is (are) partially or completely biobased.

16. A process for preparing a composition as defined in claim 1, and an article from that composition of claim 1, comprising a step of melt blending the constituents (A), (B) and (C), in an extruder, at a temperature between 230° C.

and 330° C., in order to obtain granules, followed by a step of injecting said granules at a temperature of between 230° C. and 330° C., into an injection-molding machine to obtain the desired article.

17. A fashioned article, comprising the composition as defined in claim 1, wherein said article is selected from the group consisting of fiber, fabric, film, sheet, rod, tube or injection-molded part.

18. The article as claimed in claim 17, which is a sports article.

19. The article as claimed in claim 17, which is an optical article.

20. A method of producing an article, comprising extruding, injection molding, molding or thermoforming the composition as claimed in claim 1.

21. The method of claim 20, wherein the article is a sports article or an optical article.

22. The method as claimed in claim 20, wherein the article is a ski boot, a part of a ski boot or a rigid boot with studs, a running shoe, a golf ball, a part of a golf ball, a lacrosse stick, a helmet, gloves, shoulder pads, elbow pads, knee pads or shin pads.

23. The method as claimed in claim 20, wherein the article is glasses or googles.

* * * * *